Patented Sept. 13, 1927.

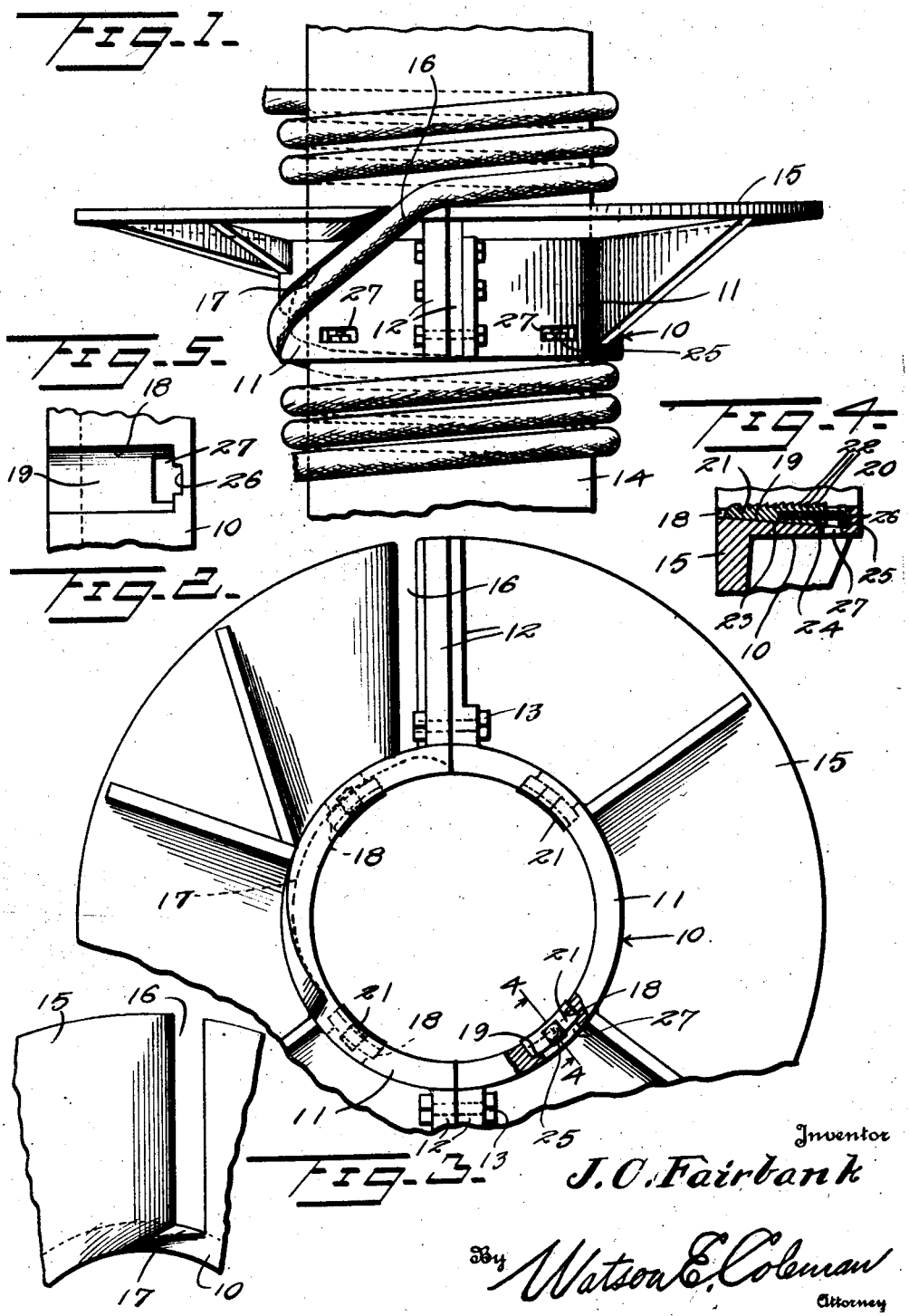

1,642,106

UNITED STATES PATENT OFFICE.

JESSE C. FAIRBANK, OF BRAMAN, OKLAHOMA.

PARTING FLANGE FOR DRUM HOISTS.

Application filed July 24, 1926. Serial No. 124,711.

This invention relates to parting flanges for drum hoists and more particularly to a device of the character normally designated as a spooling flange for use upon the shafts of bull wheels and the like.

Devices of this character are employed for partitioning the shaft of the hoist, so that a certain portion of the line which is to remain unused is partitioned from the active part of the line, thus preventing any tendency of the unused part of the line to tangle or otherwise engage with the used portion. These flanges are provided with spirally directed grooves for guiding the line from one side to the other of the flange, the spiral groove being employed, for the reason that it prevents kinking of the line and consequent destruction thereof at the point of passage through the flange. Because of the strain applied to the cable during hoisting operation, the cable is constantly exerting pressure against the flange, which tends to move it toward the unused portion of the line. This movement prevents proper guidance of the used portion of the line which is very difficult to overcome, particularly in the spooling flanges of bull wheel shafts where the strain upon the used portion of the line is substantially continuous and where the shafts are usually of wood and accordingly become quickly worn. Attempts have been made to secure these flanges against movement by clamping the sections of the flange securely upon the shaft, but this construction has proved insufficient. In some cases, a bolt is extended through the shaft and through the collar of the flange, but this practice is dangerous in that the bull wheel shaft is subjected to sudden and enormous strains and the addition of anything which tends to weaken the same is liable to cause a serious accident. While, of course, there would be no weakening of the shafts, so long as the flange remained tightly clamped thereagainst, the weakness would be present and pronounced when the flange became loosened sufficiently to permit a slight movement thereof. Accordingly, an important object of this invention is to provide a spooling flange formed in sections and clamped about the shaft which may be securely fastened in position upon the shaft without weakening the shaft in any way.

A further object of the invention is to provide a device of this character which may be readily and cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a fragmentary plan view of a bull wheel shaft showing a spooling flange attached thereto and constructed in accordance with my invention;

Figure 2 is an end elevation of the spooling flange, portions being broken away to show the mounting of the slips;

Figure 3 is a fragmentary elevation of the opposite face of the flange showing the slot formed therein;

Figure 4 is a section on the line 4—4 of Figure 2;

Figure 5 is a fragmentary view of the inner face of the collar showing the recess provided for the reception of the slips.

Referring now more particularly to the drawings, the numeral 10 indicates a collar for engagement with a shaft, this collar being formed in two semi-spherical sections 11, the ends of which have outstanding radially directed flanges 12 adapted for the reception of bolts 13 whereby the sections may be bolted together about a shaft 14. At one end, the collar is provided with an outstanding annular flange 15, this flange having a radial slot 16 formed therein. This slot communicates with the corresponding end of a spiral groove 17 formed in the outer face of the collar and through which the cable may be guided. This form of guiding means for the cable is preferred to that ordinarily employed in such devices in that kinking of the wire line may be materially reduced by permitting the wire line to be transferred from one side to the other of the flange 15 without separation thereof from the hub or shaft 14 any more than is absolutely necessary. The inner face of the sections 11 of the collar 10 is provided with longitudinally directed grooves 18, the outer walls 19 of which taper, so that the grooves have their least depth at the flange bearing end of the collar. The grooves terminate short of the opposite end of the collar, so that a shoulder 20 is formed, facing the flange bearing end of the collar. Within each groove is located a wedge or slip 21, the inner face of which conforms in shaping to the face of the shaft and is provided with transversely extending teeth, the faces 22 of which face away from the flange bearing end of the collar and are in the form of abrupt shoulders while the opposite faces 23 thereof are gradually tapered. Any suitable means may be provided for adjusting the slips 21 longitudinally within their grooves. In the present instance, the slips have been illustrated as having threaded therein machine bolts 24, the heads 25 of which seat in suitable sockets 26 formed in the shoulders 20 and are accessible from the exterior of the collar through openings 27 connecting the larger end of each groove with the outer face of the collar.

It will be obvious that by adjusting the screws 25, the wedges will be very firmly forced into engagement with the bull wheel shaft 14 and due to the fact that the shoulders 22 of the teeth are abrupt, movement thereof longitudinally of the shaft, in the direction of the arrow of Figure 1, will be prevented. Since the unused end of the line is always disposed at the unflanged side of the collar, it follows that the strain applied to the line will be ineffective to move the collar upon the shaft.

Since the construction hereinbefore set forth is obviously capable of a certain range of change and modification without materially departing from the spirit of the invention, I do not limit myself to such specific structure except as hereinafter claimed.

I claim:—

1. A spooling flange for use upon the shafts of bull wheels and the like comprising a split collar adapted to be clamped upon the shaft and having at one end thereof a flange, the inner face of the collar having longitudinally extending grooves decreasing in depth toward the flanged end thereof, wedge-shaped slips disposed within said grooves and having the butt ends thereof remote from the flanged end of the collar, means for adjusting the slips longitudinally of the grooves and teeth upon the shaft confronting faces of the slips having abrupt shoulders facing away from the flanged end of the collar.

2. A parting or spooling flange for use upon the shafts of bull wheels and the like, a split collar adapted to be assembled upon and clamped about the shaft and having at one end thereof a flange, the flange having a slot formed therein, the outer face of the collar being formed with a spiral groove one end of which communicates with the slot for directing to the slot a hoisting cable or the like to thereby permit separation of the used and unused portions of the cable, the inner end of the slot coinciding with the base of the groove, the inner face of the shaft having tapered longitudinally directed grooves the smaller ends of which are arranged at the flanged end of the collar, wedge-shaped slips disposed within said groove, means for adjusting the slips longitudinally within the groove and teeth formed upon the shaft engaging faces of the slips having abrupt shoulders facing away from the flanged end of the collar.

3. A parting or spooling flange for use upon the shafts of bull wheels and the like a split collar adapted to be assembled upon and clamped about the shaft and having at one end thereof a flange, the flange having a slot formed therein, the outer face of the collar being formed with a spiral groove one end of which communicates with the slot for directing to the slot a hoisting cable or the like to thereby permit separation of the used and unused portions of the cable, the inner end of the slot coinciding with the base of the groove, the inner face of the shaft having tapered longitudinally directed grooves the smaller ends of which are arranged at the flanged end of the collar, wedge-shaped slips disposed within said groove, means for adjusting the slips longitudinally within the groove and teeth formed upon the shaft engaging faces of the slips having abrupt shoulders facing away from the flanged end of the collar, said means for adjusting the slips including machine screws threaded into the slips and abutting with their heads the end walls of the groove, the collar adjacent said end walls of the groove having openings formed therein for the insertion of a wrench.

In testimony whereof I hereunto affix my signature.

JESSE C. FAIRBANK.